United States Patent [19]

Machnee

[11] Patent Number: 4,570,491
[45] Date of Patent: Feb. 18, 1986

[54] RATE METER AND METHOD OF DETERMINING DISTRIBUTION RATES

[75] Inventor: Cecil B. Machnee, Yorkton, Canada

[73] Assignee: Morris Rod Weeder Co. Ltd., Yorkton, Saskatchewan, Canada

[21] Appl. No.: 647,167

[22] Filed: Sep. 4, 1984

[51] Int. Cl.⁴ ............................................. G01F 1/00
[52] U.S. Cl. ........................................ 73/861; 177/50
[58] Field of Search ........................ 73/861, 223, 426; 222/1; 177/50

[56] References Cited

U.S. PATENT DOCUMENTS

| | | | |
|---|---|---|---|
| 266,395 | 10/1882 | Sharp | 73/223 |
| 1,299,861 | 4/1919 | Powers | 73/223 |
| 4,239,128 | 12/1980 | Longnecker | 222/1 |
| 4,491,023 | 1/1985 | Graef | 73/861 |

*Primary Examiner*—Donald O. Woodiel

*Attorney, Agent, or Firm*—Schmidt, Johnson, Hovey & Williams

[57] ABSTRACT

A rate measuring device comprises a beam with a plurality of graduated scales and a cup on one end thereof. While a material dispensing machine is moved a certain distance, the material normally applied to the ground is collected in a container and subsequently transferred to the cup. Next, a fulcrum is placed beneath the beam in a position to exclusively carry and horizontally balance the beam. The operator then reads the graduated scale at a location vertically above the fulcrum, the scales being calibrated in terms of pounds per acre or kilograms per hectare. Consequently, the farmer can directly read his application rate of materials dispensed per acre or hectare, while, in actuality, the machine has been driven only a short distance. In one embodiment, the fulcrum is attached to a handle portion which contains a reel adapted to hold a measuring tape or string used to mark the distance the machine must travel.

16 Claims, 6 Drawing Figures

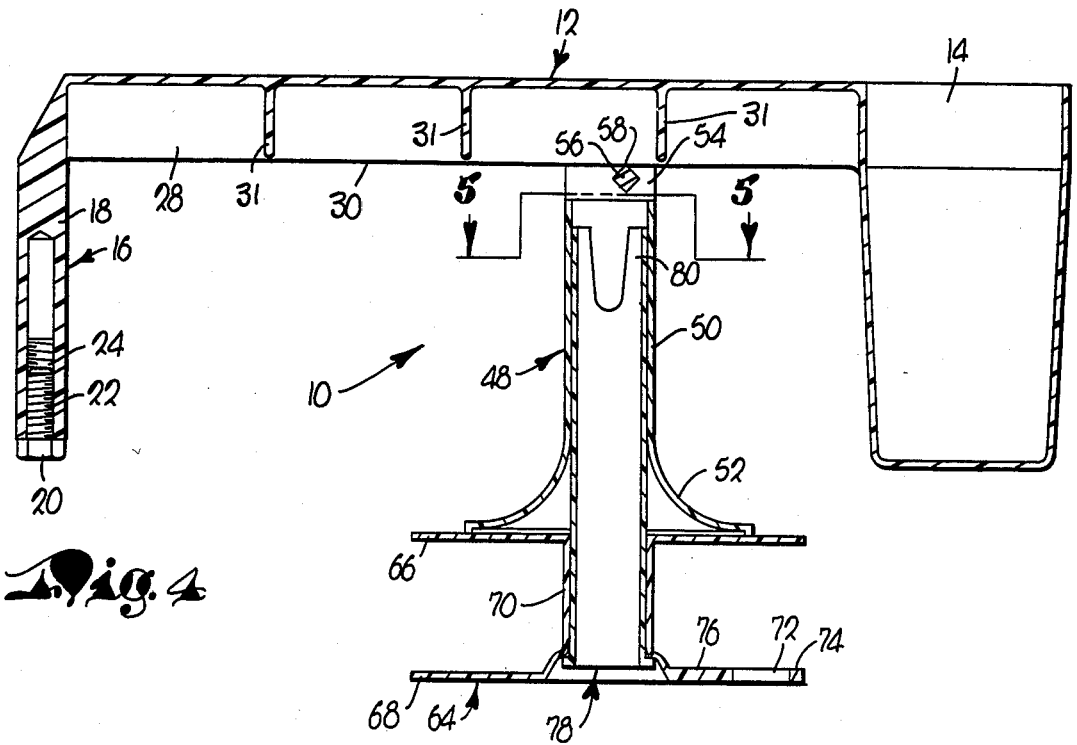
Fig. 4
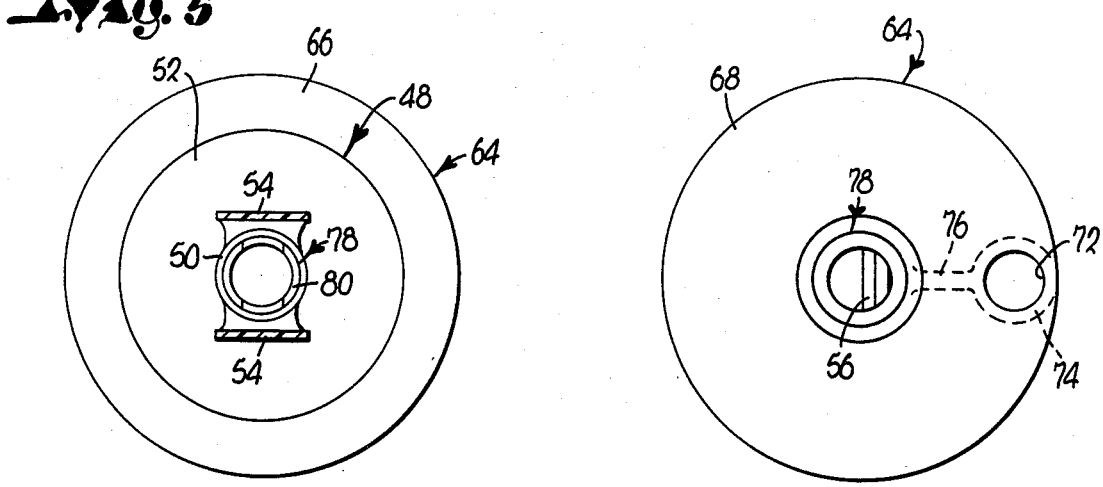
Fig. 5
Fig. 6

RATE METER AND METHOD OF DETERMINING DISTRIBUTION RATES

BACKGROUND OF THE INVENTION

1. Field of the Invention

This invention relates to a measuring device for determining the distribution rate of agricultural chemicals, seeds and other materials applied upon the ground.

2. Description of the Prior Art

There are a wide variety of agricultural materials in use today which are distributed on the land by a dispensing machine. These materials may consist of solid matter such as seeds, granular fertilizers or other chemicals, or may comprise a sprayable liquid herbicide, fertilizer or other plant or soil treatment. These substances may be applied upon a soil surface, plant surface, or within the soil by means of a soil opener mechanism. Generally, such substances are distributed by a material-dispensing machine having a plurality of outlets arranged in a row across the width of the machine, and as the machine forwardly travels a certain lineal distance, the row of outlets applies the substances over an area of land.

The rate at which material is dispensed is often very critical for successful farming practice. For example, inadequate application of seeds, insecticides or herbicides will usually result in unsatisfactory crop yields; unfortunately, the problem is often not noticed until the damage is beyond repair. Alternatively, overapplication of these costly materials can have a severe adverse effect on farm profits. In either case, time and fuel are also wasted. As a consequence, there is a great need for accurately checking the output of substances from these dispensing machines.

Machines for seeding, fertilizing, and applying chemicals each have a particular type of rate dispensing mechanism which is adjustable to vary the amount of materials applied as the machine traverses the ground. Often, such machines have a delivery-restricting aperture which may be variable in size to produce the desired rate of flow. The size adjustment mechanism on the machine usually must be set according to an instruction manual containing information concerning an approximate setting for the aperture depending on the type of material being dispensed. However, reliance on such a setting will cause inaccurate results, due to mechanical wear in the aperture and clogging of the delivery tube.

When sowing seeds, such aperture-dependent dispensing machines may cause improper plant populations due to differing grain sizes or shapes. For example, different batches of wheat may lead to dissimilar plant populations because one batch may have smaller, heavier seeds while the other batch has larger, lighter seeds. Again, because the dispensing mechanism meters the seeds on the ground by size or volume and not by mass, the farmer's dependency on the aperture setting can result in costly error.

Furthermore, although the dispensing machine normally meters the materials onto the ground according to their size or volume, the proper application rate of these substances is often specified in terms of a given weight of materials applied to a certain area of land. For example, while a granular soil insecticide may be metered out of a dispensing machine by an aperture or other size-dependent mechanism, the application rate of the insecticide is often specified by the manufacturer in terms of a kilogram per hectare quantity. To adjust the dispensing rate, the farmer would refer to an instruction manual to determine the proper setting of the size-variable aperture, and then must compensate for the density of the material if the latter is hygroscopic. Even though time consuming, these computations still can give at best only a rough estimate of the weight of the material actually applied to the ground.

Various methods have been used in the past to check the actual dispensing rate of these machines. Commonly, the machine is filled with the materials and then driven over a known area. By measuring the amount of materials used to then refill the machine, the farmer can determine the application rate by dividing this amount by the area of land covered by the applied materials. Unfortunately, this method is subject to numerous shortcomings. The farmer must make difficult and time consuming calculations, and must compensate for any settling of the material in the hopper of the machine as the latter is driven over the rough ground. Also, if the amount was measured by volume, the farmer must multiply by an assumed density to obtain the weight distributed per area, consequently introducing further potential for error.

Another method in use which measures the volume output of materials from a dispenser comprises a small calibration bag or cylinder placed under one of the nozzles or delivery tubes of the dispensing machine. In use, the farmer first determines the nozzle or delivery tube spacing on the machine and then forwardly drives the machine a certain lineal distance that will cause the materials to be distributed over a certain quantity of land area. After the sample is collected in the bag or cylinder, calibration marks on the bag indicate the volume of material that would normally be dispensed over an acre or hectare. For example, if the nozzle spacing on the machine is 10 centimeters, the farmer would put the bag under the nozzle and move the machine 100 meters, and thus the sample collected in the bag would represent the amount of material normally applied to one ten thousandth of a hectare. Next, the farmer would locate a calibration mark on the bag corresponding to the level of materials in the latter and read an adjacent numeral representing the liters of materials distributed over hectare. Thus, although the farmer has actually collected the sample over only one ten thousandth of a hectare, the farmer can directly read a value on the bag expressed in terms of liters per hectare.

Unfortunately, such calibration bags or cylinders also utilize a volume measurement which is subject to the same shortcomings described hereinabove. Because the material is measured by volume, readings for solid substances can be affected by settling or packing as the machine travels over the rough surface of the field. Also, most materials are sold or measured by weight and the volume per area measurement given by these bags must often be then converted to terms of weight per area, thus leading to additional complications in use and also introducing a possibile computation error. As a result, these calibration bags and cylinders have not satisfactorily met the needs of most farmers.

Some machines have electronic monitoring means to count population or to measure the volume or mass being dispensed. However, these systems are dependent on the accuracy and consistency of the dispensing mechanism. Also, the electronic monitors which depend on volume displacements cannot compensate for various densities.

SUMMARY OF THE INVENTION

My present invention overcomes the disadvantages of the prior art. The rate meter measures the weight of a sample but the operator can directly read the dispensing rate in terms of pounds per acre, kilograms per hectare, or another weight per area measurement.

In particular, my invention comprises a beam scale having a cup portion adapted to support a sample of material. In use, the farmer collects the material being dispensed from the machine as the machine drives a particular lineal distance. This lineal distance is dependent on the spacing of the delivery tubes or nozzles, such that the material collected in the container represents the amount of material normally distributed over one ten thousandth of a hectare.

Once the sample is transferred from the container to the cup portion of the scale, a fulcrum is moved along the bottom surface of the beam until the latter is horizontally balanced. A graduated scale on the surface of the beam has a set of index marks and corresponding numerals attached thereto. In use, a value may be determined from the scale directly above the top of the fulcrum, representing the weight of material dispensed over a unit quantity of area, such as pounds per acre, tons per acre, or kilograms per hectare. As a result, although the sample collected represents material applied to only one thousandth of a hectare, the reading from the beam scale is given in more useful and convenient terms.

In my present invention, the weight of the material rather than the volume material is measured, rendering the density unimportant. The need to convert, for example, from bushels to pounds is eliminated, reducing the possibility of computational mistakes and error from density variation due to the grade, variety and moisture content of the material. Also, since most of the manufacturers recommend a rate application in terms of a weight per area, and not volume per area, the present rate measuring device greatly simplifies the task of the farmer.

Furthermore, the invention is compact, economical to manufacture, and easy to use. In contrast to some of the prior art, the accuracy is not dependent on machine wear or clogging. Size or shape of the material is also unimportant. The farmer can quickly determine his application rate while in the field, thus insuring that expensive materials will not be wasted, labor efficiency will be maximized, and that crop yields will be as high as possible.

IN THE DRAWINGS

FIG. 4 is a transverse cross-sectional view taken along line 4—4 of FIG. 2;

FIG. 5 is a transverse cross-sectional view taken along line 5—5 of FIG. 4; and

FIG. 6 is a bottom view of the rate meter.

DETAILED DESCRIPTION OF THE DRAWINGS

Figure 1:
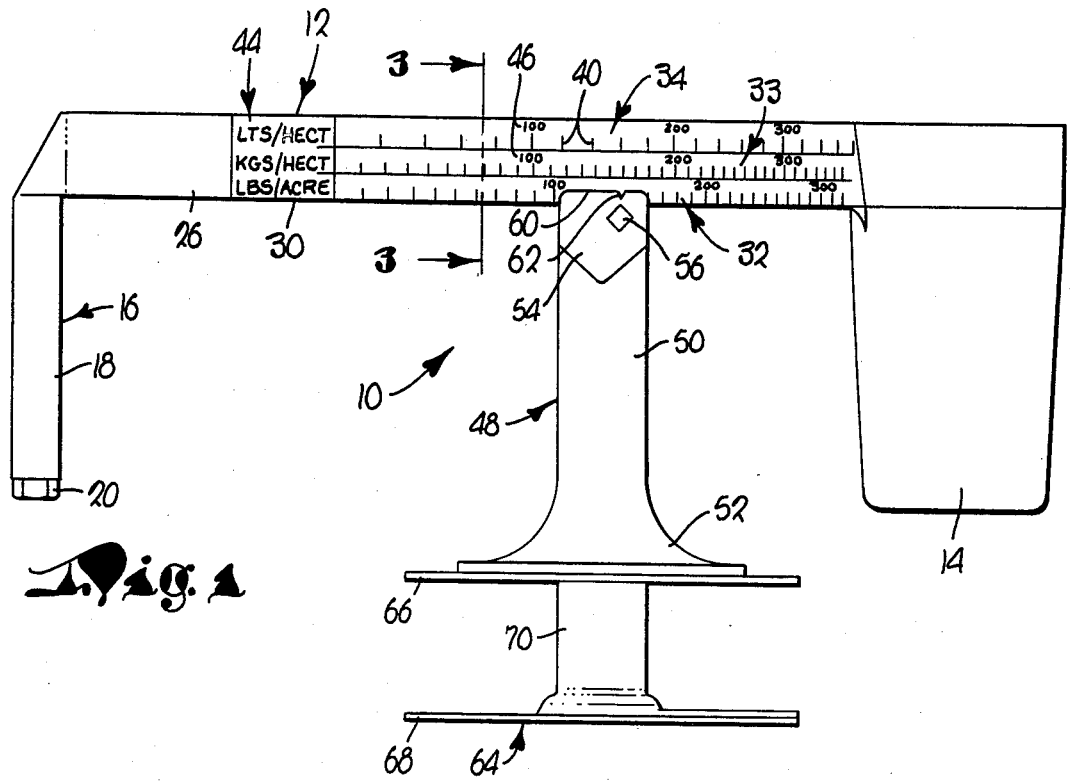
FIG. 1 is a side elevational view of my rate measuring device constructed according to my present invention.
Figure 2:
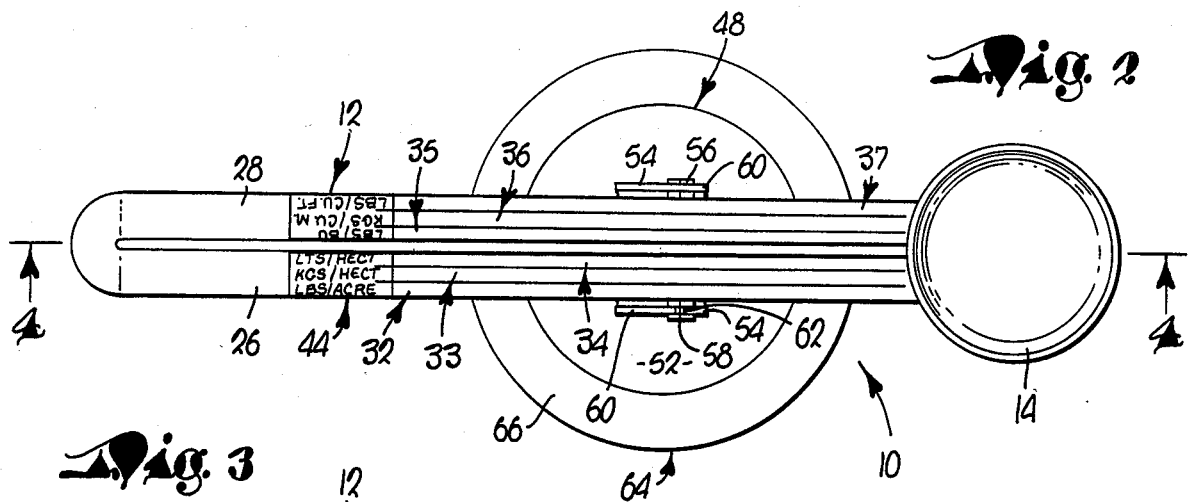
FIG. 2 is a top plan view thereof.
Figure 3:
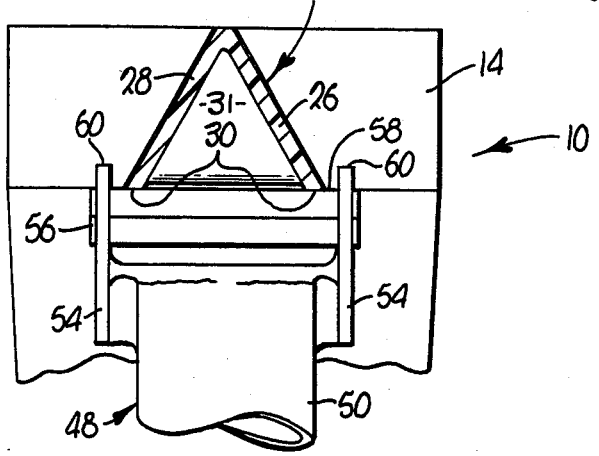
FIG. 3 is an enlarged, fragmentary, transverse cross-sectional view taken along line 3—3 of FIG. 1.

A rate measuring device 10 has an elongated beam 12 with a cup 14 attached adjacent one end thereof. The cup 14 is generally cylindrical, having a closed bottom and an open top and presenting a volume of one-half liter. A counterweight 16 is connected to the end of the beam 12 remote from the cup 14 and comprises a generally cylindrical leg portion 18 and a bolt 20 having threads 22 complemental to a threaded bore 24 within the leg portion 18.

The beam 12 is elongated and has an inverted V-shaped transverse cross-sectional configuration, presenting a pair of flat, longitudinally-extending, substantially identically-sized exterior side surfaces 26, 28 and a pair of coplanar, longitudinally-extending bottom surfaces 30. A set of three transverse braces 31 strengthen the beam 12.

A set of three graduated scales 32, 33, 34, are disposed on side surface 26 and a set of three graduated scales 35, 36, 37 are disposed on side surface 28. Each of the scales has a plurality of elongated index marks 40 extending in a plane perpendicular to the longitudinal axis of the bottom surface 30 and disposed in spaced relation along a row extending parallel to the longitudinal axis of the side surfaces 26, 28. A legend 44 and a plurality of numerals 46 are cooperatively associated with each of the scales 32–37. As shown, the scale 32 has the legend 44 labeled "lbs/acre" while the scale 33 is marked "kgs/hect" and the scale 34 is designated "lts/hect". The scale 35 is marked "lbs/bu", the scale 36 is marked "kgs/cu.m." and the scale 37 is labeled "lbs/cu.ft."

A normally upright, elongated handle 48 comprises a hollow cylindrical portion 50 terminating at its lower end in a funnel-shaped base 52. A pair of flat flanges 54 remote from the base 52 are disposed exteriorly of the cylindrical portion 50 in parallel, spaced relation. A fulcrum 56 perpendicularly connects the flanges 54 and presents an upper edge 58 therebetween. Each of the flanges 54 has an elongated, upper end 60 perpendicular to the longitudinal axis of the cylindrical portion 50. A V-shaped, scale-reading notch 62 is disposed on each of the ends 60 vertically above the upper edge 58 of the fulcrum 56.

A reel 64 is comprised of two flat, circular plates 66, 68 connected therebetween by a hollow cylindrical tube 70. The lower plate 68 has a finger hole 72, reinforced by a boss 74 extending therearound and a rib 76 extending radially inward. A pin 78, threaded through the reel 64 and the cylindrical portion 50, has a fork shaped upper end 80 that provides an interference fit within the cylindrical portion 50, such that the reel 64 is rotatable beneath the base 52 in concentric engagement therewith.

OPERATION

In use, the operator first must determine the lineal distance a dispensing machine must travel to apply materials to a known area. One ten thousandth of a hectare is a convenient area with which to work. A chart with lineal travel distances corresponding to various spacings of dispensers is provided with the rate meter to assist the operator in determining the lineal travel distance of his machine. The product of each spacing and lineal distance will result in the same area, in this case being one ten thousandth of a hectare. For example, if the nozzles are spaced twenty centimeters apart, the machine must be moved fifty meters. A measuring tape (not shown), which may be conveniently store on the reel 64, is used to mark the length of travel. If the nozzle spacing on the machine remains unchanged, a string of the proper length could alternatively be stored on the reel 64 and used to measure this lineal distance.

Next, the operator moves the dispensing machine over the measured, predetermined distance, simultaneously collecting the materials dispensed during this movement. Commonly, such materials may be collected within a bag or other container attached to the nozzle or delivery tube. Subsequently, the collected materials are transferred to the cup 14 on the rate measuring device 10.

Next, the bottom surface 30 is positioned over the edge 58 such that the fulcrum 56 will exclusively carry and horizontally balance the beam 12. The operator then reads the numeral 46 on the scale 32 or 33, at a position vertically above the notch 62. The numerals indicate the weight of material distributed over a unit quantity of area, such that the known, measured quantity of area actually traversed by the machine is different from this unit quantity of area. As a result, the operator can directly read his output rate in terms of pounds per acre or kilograms per hectare.

Noteworthy is the fact that in typical use the operator need not refer to an instruction manual associated with the machine or perform complicated calculations in the field. Because many materials should be applied according to a recommended rate in pounds per acre or kilograms per hectare, my present invention allows the farmer to readily determine the accuracy of his dispensing machine. There is no need to compensate for the density of the material, which could vary according to moisture content, shape or other factors, and consequently the elimination of this step reduces the possibility of human error.

Additionally, the rate measuring device is inexpensive, simple and compact. If desired, the beam 12 with its attached cup 14 and counterweight 16 may be used in the field without the handle 48 or reel 64. Instead, the farmer may simply use a knife or other edge to horizontally balance the beam. Furthermore, the stability of the rate measuring device 10 is enhanced by its "saddle bag" configuration and low center of gravity, reducing the tilting movement of the beam 12 while balanced on a sharp edge. Additionally, the bottom surface of the counterweight 16 is disposed in the same plane of the bottom surface of the cup 14, such that the rate measuring device 10 may be set on a generally horizontal surface without tipping.

The bolt 20 may be removed and replaced with a smaller or larger bolt, such that the counterweight 16 can adjustably balance a wide weight range of materials within the cup 14. In this case, the side surfaces 26, 28 may be equipped with removable engraved plates having graduated scales for alternate applications.

The rate measuring device 10 has been equipped with other scales useful to the farmer. The scale 34 is used during spraying of liquids and the operator can read the application rate in units of liters per hectare.

Also, the scales 35, 36, 37 on the side surface 28 measure the density of material when desired. In this use, the cup 14 is filled with the material until the latter is level with the upper edge of the cup 14. For additional accuracy, before the sample is leveled to the top of the cup, the material should be settled or compressed to the degree the material normally is compressed in use. Next, the operator can read the appropriate scale 35, 36, or 37 to directly read the density of the material. Again, the operator would read the value on the scale 35, 36, 37 vertically above the apex of the notch 62 while the beam 12 is horizontally balanced.

It should now become readily apparent to those skilled in the art that other weighing devices may be used in conjunction with the above method. For example, an electronic scale may be calibrated to directly indicate the output rate of a dispensing machine in terms of a weight per a unit quantity of area. The rate meter may also be made using various styles of balances including balances which use weight which slides on a beam and balances with multiple beams.

Having thus described the invention, what is claimed as new and desired to be secured by Letters Patent is:

1. A rate measuring device for determining the output of a material-dispensing machine comprising:
   a support for carrying a sample of material, said sample having a weight equal to the weight of the material distributed over a known quantity of area;
   response means associated with said support means, responsive to the weight of the sample;
   numerals cooperatively associated with the response means, indicating the weight of material distributed per a unit quantity of area wherein said known quantity of area is different from said unit quantity of area.

2. For use with a fulcrum having an upper edge, a rate measuring device for determining the output of a material-dispensing machine comprising:
   a beam;
   means connected to the beam for support of a sample of material, said sample having a weight equal to the weight of the material distributed upon a known quantity of area;
   a bottom on the beam having a number of fulcrum-engageable positions;
   at least one graduated scale connected to the beam; and
   numerals marking at least a portion of at least one of the scales and cooperatively associated with said fulcrum-engageable positions, such that when the fulcrum engages the bottom in a position to exclusively carry and horizontally balance the beam, the numerals associated with that position indicate the weight of material distributed per a unit quantity of area, wherein said unit quantity of area is different from said known quantity of area.

3. The invention of claim 2, said beam being elongated and having an inverted V-shaped transverse cross-sectional configuration, having a pair of flat longitudinally-extending substantially identically-sized exterior side surfaces and a pair of coplanar, longitudinally-extending bottom surfaces presenting said fulcrum-engageable positions, wherein said fulcrum-engageable positions lie along an axis perpendicular to the longitudinal axis of the beam.

4. The invention of claim 3, said graduated scales disposed on the side surfaces; each of said scales having a plurality of elongated index marks extending in a plane perpendicular to the longitudinal axis of the bottom surfaces, and disposed in spaced relation along a row extending parallel to the longitudinal axis of the side surface.

5. The invention of claim 4; and a legend cooperatively associated with each of the scales, labeling the units of measurement corresponding to the numerals.

6. The invention of claim 5, said support means being a cup.

7. The invention of claim 6, said cup attached adjacent one end of the beam.

8. The invention of claim 7; and a counterweight connected to the end of the beam remote from the cup.

9. The invention of claim 7; further comprising:
at least one additional scale disposed at least one of the side surfaces; and
additional numerals marking at least a portion of the additional scales and cooperatively associated with said fulcrum-engageable positions, such that when the fulcrum engages the bottom in a position to exclusively carry and balance the beam, and said cup is levelly filled with the sample, the additional numerals indicate the weight of the materials per a unit quantity of volume.

10. A rate measuring device for determining the output of a material-dispensing machine comprising:
a normally upright, elongated handle;
an elongated fulcrum with an upper edge connected to said handle;
a beam;
means connected to the beam for support of a sample of material, said sample having a weight equal to the weight of the material distributed upon a known quantity of area;
a bottom on the beam having a number of fulcrum-engageable positions;
at least one graduated scale connected to the beam; and
numerals marking at least a portion of at least one of the scales and cooperatively associated with said fulcrum-engageable positions, such that when the fulcrum engages the bottom in a position to exclusively carry and horizontally balance the beam, the numerals associated with that position indicate the weight of material distributed per a unit quantity of area, wherein said unit quantity of area is different from said known quantity of area.

11. The invention of claim 10, said handle comprising a hollow cylindrical portion terminating at its lower end in a funnel-shaped base, and having a pair of flat flanges remote from said base disposed exteriorly of the cylindrical portion in parallel, spaced relation, wherein said fulcrum perpendicularly connects the flanges and presents an upper edge to carry said beam perpendicularly of the fulcrum between said flanges.

12. The invention of claim 11, each of said flanges having a V-shaped, scale-reading notch on the upper end thereof with an apex disposed vertically above said upper edge of the fulcrum.

13. The invention of claim 12; and a measuring string holding reel disposed beneath said base in concentric engagement therewith.

14. The invention of claim 13, said reel being rotatable and having a finger hole proximal to its lower periphery thereon.

15. The method of determining the output rate of a material-dispensing machine, which comprises the steps of:
moving a dispensing apparatus over a known quantity of area;
collecting the materials discharged from the dispensing apparatus over said known area;
supporting the collected materials on a measuring device responsive to the weight of the sample; and
reading a numeral cooperatively associated with said measuring device, wherein the numeral indicates the weight of material dispensed per a unit quantity of area, said unit quantity of area being different than said known quantity of area.

16. The method of determining the distribution rate of chemicals, seeds or other materials upon a ground area, which comprises the steps of:
determining the lineal distance a dispensing machine must travel to apply materials to a certain known quantity of area;
moving the dispensing machine said determined lineal distance;
collecting the materials dispensed during said movement;
transferring the collected materials to a cup attached to a beam;
sliding a fulcrum engaging the bottom of the beam until the fulcrum is in a position to exclusively carry and horizontally balance the beam; and
reading a graduated scale at a position vertically above said fulcrum, wherein the value determined indicates the weight of materials distributed per a unit quantity of area, wherein said certain known quantity of area is different from said unit quantity of area.

* * * * *